United States Patent [19]

Menzel

[11] 4,308,082
[45] Dec. 29, 1981

[54] METHOD OF FORMING A TUBULAR ARTICLE

[75] Inventor: Julian M. Menzel, Sempahore Park, Australia

[73] Assignee: Rib Loc (Hong Kong) Ltd., Hong Kong, Hong Kong

[21] Appl. No.: 160,585

[22] Filed: Jun. 18, 1980

Related U.S. Application Data

[62] Division of Ser. No. 950,085, Oct. 10, 1978, Pat. No. 4,209,043.

[30] Foreign Application Priority Data

Oct. 18, 1977 [AU] Australia .............................. PD2100
Feb. 15, 1978 [AU] Australia .............................. PD3384

[51] Int. Cl.³ ............................................ B65H 81/00
[52] U.S. Cl. ....................................... 156/91; 29/437; 29/458; 29/521; 156/195

[58] Field of Search ................ 156/143, 195, 187, 91, 156/92, 218, 217; 29/435, 437, 453, 456, 521; 228/137, 145; 428/121; 285/DIG. 22, 330; 138/154, 122, 129, 135, 148

[56] References Cited

U.S. PATENT DOCUMENTS

| | | | |
|---|---|---|---|
| 2,354,485 | 7/1944 | Slaughter | 138/129 |
| 2,739,089 | 3/1956 | Hageltorn | 138/129 |
| 3,495,628 | 2/1970 | Boender | 138/150 |
| 3,679,531 | 7/1972 | Wienand et al. | 138/154 |
| 3,713,381 | 1/1973 | Seck | 156/143 |
| 4,129,152 | 12/1978 | Davis | 138/129 |

*Primary Examiner*—Michael W. Ball
*Attorney, Agent, or Firm*—Gordon L. Peterson

[57] ABSTRACT

The formation of articles using an elongated strip which has on it a series of longitudinally positioned upstanding ribs to form between them a series of longitudinally positioned channels and including connectors on the strip spaced apart transversely on the strip whereby the strip can be wound helically to form an elongated object with the connectors interengated along a helical line to lock the strip in object form.

6 Claims, 14 Drawing Figures

METHOD OF FORMING A TUBULAR ARTICLE

This is a division of application Ser. No. 950,085 filed Oct. 10, 1978, now U.S. Pat. No. 4,209,043.

FIELD OF THE INVENTION

The invention relates to the formation and strengthening of tubular objects such as pipes.

DESCRIPTION OF THE PRIOR ART

It is known to use plastic pipes for conveying water and other fluids and when buried, particularly in large diameters, have by necessity, because of earth loading or pressure test requirements, needed to have wall thicknesses of substantial dimensions thus making such pipes expensive.

Another problem with tubular objects is the bulk they present during transport and it has been proposed heretofore to form such tubular objects from strip and to wind the strip helically and to join the contiguous edges to form the tubular object, such a system being described in the specification of U.S. Pat. No. 3,938,558 which deals with a longitudinally corrugated metal strip which has edges which can be contiguously joined.

It is also known to form a flexible hose from strip which has shaped longitudinal edges so arranged that when the strip is helically wound the one edge engages in the configuration of the other edge to seal the hose and form a flexible member which has an upstanding helical configuration on it but the strip is of relatively narrow width.

A further known method is to use a strip of somewhat wider form, formed of a synthetic material which again has the longitudinal edges shaped so that the one edge can engage into a socket in the other edge when the edges are contiguously positioned, this being disclosed in the specification of U.S. Pat. No. 3,606,670. The specification also discloses a machine for rolling the strip to helical form and pressure joining the edges.

The object of the present invention is to provide an improved form of strip and method of use which will have certain advantages over the known art and which avoids the need to have heavy sections and which can be used to form a tubular object such as a pipe or can be associated with a preformed pipe to stiffen and reinforce the pipe.

A further object of the invention is to provide a strip which can be wound onto a plastic pipe and can protect the pipe and if necessary can substantially reinforce the pipe.

A still further object is to provide a strip which can be wound into the form of a pipe and which has a configuration such that there will be adequate strength in such a pipe because of a helical configuration of reinforcements used on the strip.

A still further object is to provide a compound pipe consisting of an inner core and a surround which is locked to the pipe to provide a channel construction around the pipe to increase the strength and rigidity of the pipe which can also be used for secondary purposes such as secondary conveyor channels as part of the pipe.

A still further object is to provide a form of strip which can be used in such a way that it forms a series of channels around the tubular object by using the strip in different ways and by, for instance, winding one strip on another as well as helically winding the two strips.

These and other objects will be appreciated from a description of the invention which follows.

SUMMARY OF THE INVENTION

The method of forming and reinforcing tubular articles according to this invention comprises using a continuous strip having a series of upstanding ribs spaced along the width of the strip and connecting means on the said strip spaced apart transversely on the said strip and adapted to be connected together when the strip is wound helically on itself, the ribs defining a series of open channels longitudinally located on the strip, and winding the strip into a helical configuration to form a tubular article.

The strip itself comprises a continuous strip formed by extrusion or similar means from a plastic material which has a series of ribs spaced along the width of the strip, and transversely spaced connecting means on the strip shaped to interengage the one with the other when such edges are placed contiguously by helically winding the strip on itself, the arrangement being such that a series of open channels are longitudinally located on the strip so that when wound into a helical configuration the tubular article has a series of spaced ribs which define channels so shaped that they may be closed by associating them with another surface where this is required.

DESCRIPTION OF THE PREFERRED EMBODIMENTS

Figure 1:
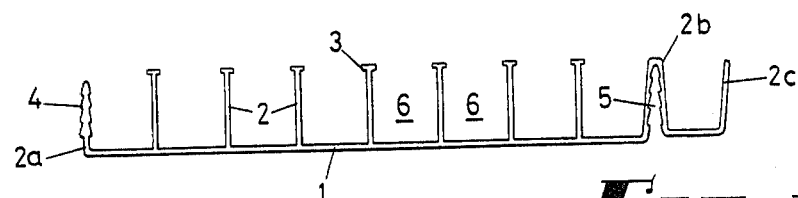
FIG. 1 is an end elevation of a strip formed according to this invention.
Figure 2:
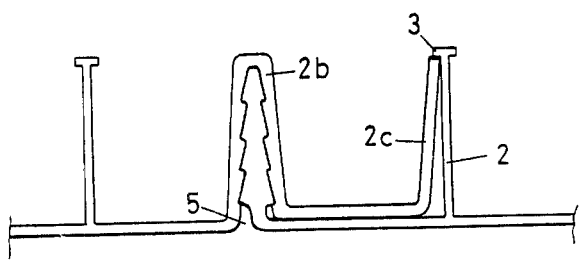
FIG. 2 is a somewhat enlarged view showing how the two edges of contiguous parts of the strip interengage when wound together in a helical manner.
Figure 3:
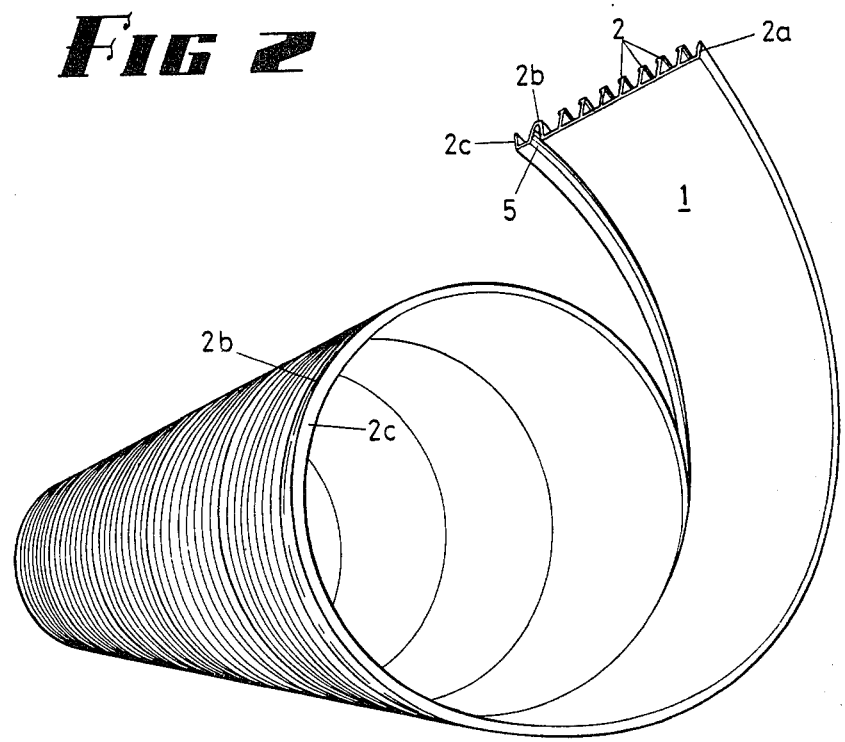
FIG. 3 is a perspective view of a tubular article manufactured from such a strip, the end of the article being shown partly unformed to clearly show the strip.

Referring first to FIGS. 1, 2 and 3, it will be seen that the strip 1 has on it a series of upstanding ribs 2 which ribs are strengthened at their outer ends by small flanges 3, the rib 2a at the one edge of the strip, referred to as a joining rib, having a series of barbs 4 on it, the rib 2b near the other edge of the strip, referred to as an engaging rib, being shaped to form a barbed socket 5 and arranged so that the rib 2a can engage the socket of the rib 2b, the strip having the rib 2c shaped so that it presses against an adjacent rib 2 when the two edges are joined as shown more particularly in FIG. 2 where it will be noted that the edge of the rib 2c engages beneath the flange 3 on the rib 2. This forms a series of channels 6.

In FIG. 3 is shown how a tubular object such as a pipe is formed when a strip is helically wound and the edges interengage by forcing the rib 2a into the socket 5 of the rib 2b.

Figure 4:
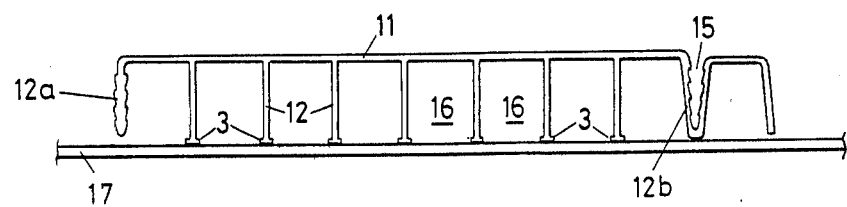
FIG. 4 is a view corresponding to FIG. 1 but showing how the strip can be reversed to provide a smooth outer surface and if required to be wound around an inner tube whereby to have a series of longitudinal channels on the strip which may be sealed to form secondary conduits.
Figure 5:
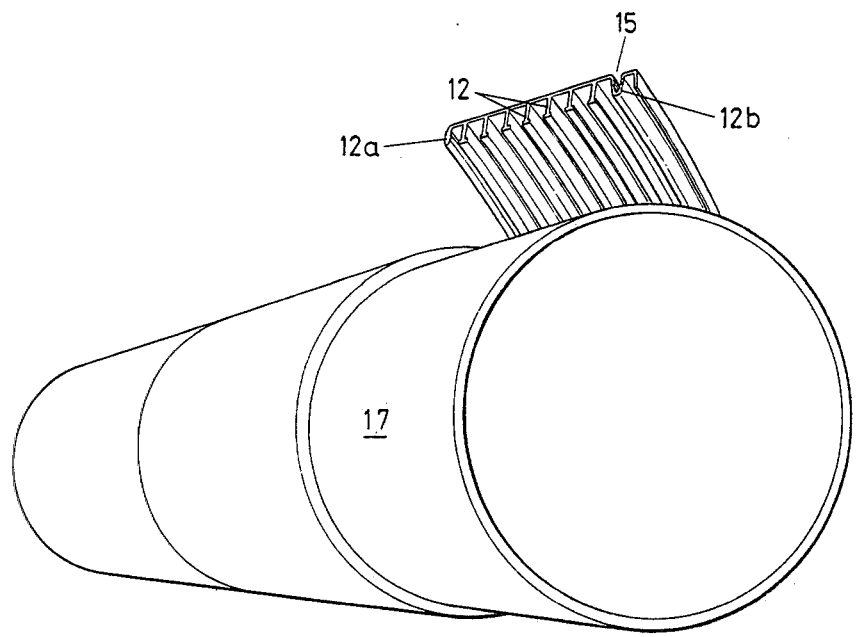
FIG. 5 is a perspective view corresponding to FIG. 3 showing a pipe with such a helically wound strip thereon.

In FIGS. 4 and 5 is again shown a strip similar to that shown in FIG. 1 but in this case the strip 11 has the rib 12 inwardly positioned when the tubular object is formed by helically winding such a strip, the strip again having a barbed joining rib 12a at one end and a socket 15 in the engaging rib 12b but in FIG. 4 this strip is shown wound onto a liner 17 which may be a pipe which is required to be reinforced, and when such a strip is tightly wound onto the liner 17 with the barbed rib 12a engaged in the socket 15 of the rib 12b a series of channels 16 result which can be sealed if required by cementing or otherwise joining the flanges 13 to the liner 17. It will be obvious however that the strip of FIG. 1 can similarly be used in this inverted manner without winding it onto a liner, and whether the configuration of FIG. 3 or FIG. 5 is used depends on whether a smooth outside surface is required or whether the ribs are merely for the purpose of stiffening and protecting and particularly whether the secondary channels are required.

Figure 6:
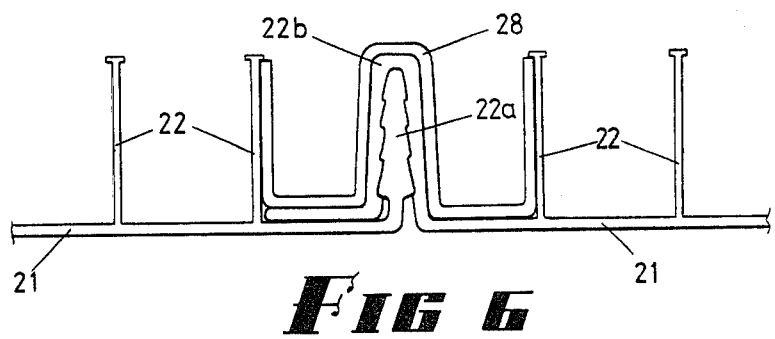
FIG. 6 shows how added members can be used to lock together the joints between two edges of such a strip.

In FIG. 6 is shown how a strip 21 can be helically wound with the ribs 22 again being upstanding from the body of the strip itself but the joint between the joining rib 22a and the engaging rib 22b which forms the socket is reinforced by placing over it an extrusion 28 which fits over the joints between the two edges of the strip and further locks the assembly together, the extrusion preferably being made of rigid polyvinyl-chloride so that not only does it lock the joint but it also provides adequate reinforcing along the marginal edges of the strip.

Figure 7:
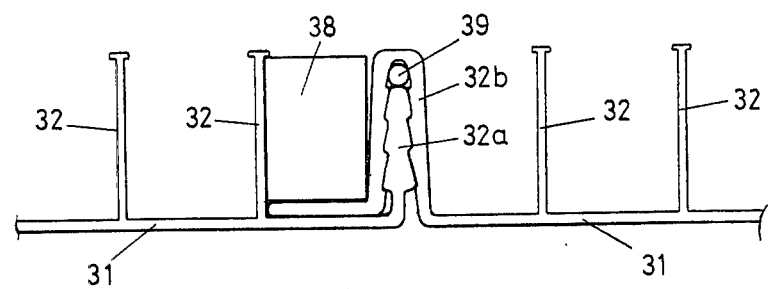
FIG. 7 shows another form of edge using a reinforcing as well as a locking member.

In FIG. 7 a similar configuration is shown with the strip 31 again having ribs 32 upstanding from it and including a barbed forming rib 32a as well as an engaging rib 32b with socket into which it fits but the edge of the strip in this case is held down by a foam packing 38 which helps to secure the lock, and also a wire 39 is shown which has the effect of providing reinforcing at the joint.

Figure 8:
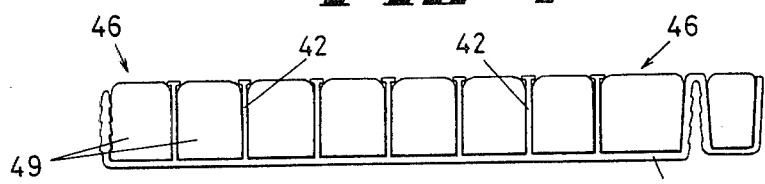
FIG. 8 shows how the form of the invention shown in FIGS. 1 to 3 can be filled in to further reinforce the strip.

In FIG. 8 a similar configuration is again used in that the strip 41 has upstanding ribs 42 but in this case the longitudinal channels 46 between the ribs are filled by a material such as concrete to form a helical filler 49. The concrete can be poured into the channels 46 and in that case the strip 41 forms a liner for the filler 49.

In FIG. 9 the strip 51 again has ribs 52 but these are spaced closer together than in the previous embodiment and have shaped flanges 53 at the outer ends which form narrow openings between them, and the strip 51 itself is apertured at 58 between the ribs 51 and the device can then be used as a bore screen or the like where water is to permeate into the hollow of the screen but sand is prevented from entering the defined space.

Figure 9:
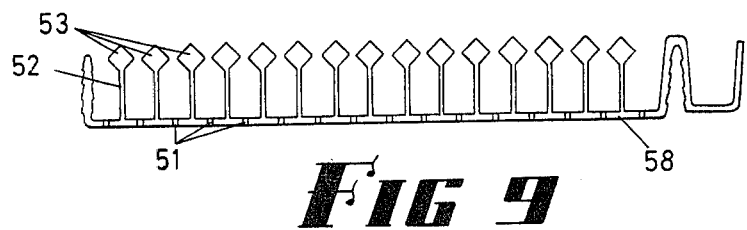
FIG. 9 shows a modified form of strip in which the ribs are relatively closely spaced and the strip itself is apertured between the ribs to provide a device which can for instance be used as a sand screen when such a strip is arranged in helical configuration.
Figure 10:
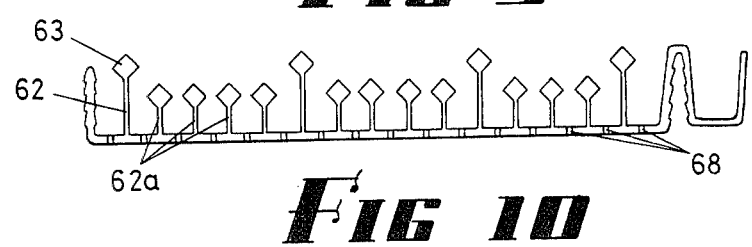
FIG. 10 shows a further embodiment of such a device.

FIG. 10 shows a similar configuration to FIG. 9 but in this case the strip 61 has larger ribs 62 at spaced intervals with smaller ribs 62d between the larger ribs 62 and here also the outside edges of the ribs 62 and 62d are provided with flanges 63 which can then form between them narrow slots so far as the smaller ribs 62d are concerned but the extending ribs 62 serve to prevent large materials from reaching and blocking the gaps between the ribs 62d, holes or slots 68 again being used through the strip to allow flow of liquid so that the device again acts as a bore screen or the like.

Figure 11:
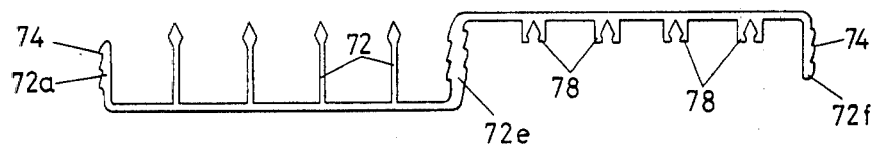
FIG. 11 shows a modified form of strip which is arranged to form a series of closed channels longitudinally when a series of these strips are joined and formed into the helical orientated tubular object.
Figure 12:
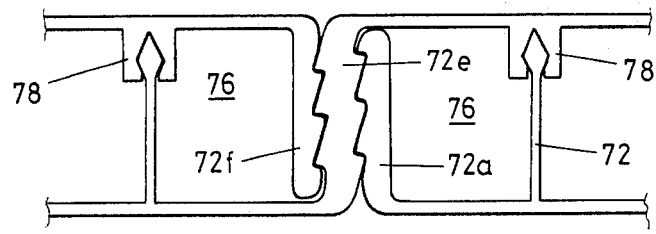
FIG. 12 is a somewhat enlarged fragmentary view showing how such a strip joins to form the closed channels.

In the form shown in FIGS. 11 and 12 the strip 71 is shaped in such a manner that closed channels 76 are provided between the upstanding ribs 72, the strip 71 in this case extending from an outer joining rib 72a, which is provided on its outer face with barbs 74, to an intermediate rib 72e, which forms the engaging rib, which again has barbs 74, but on both faces, and the opposite end of the continued strip has a further, but down-formed, rib 72f on it with again barbs 74 at the outer face. One part of the strip has ribs 72 extending in the same directions as the rib 72a, but the other part of the strip has sockets 78 spaced similarly to the ribs 72 but down formed so that no one part of such strip is placed on the other part of the strip, the ribs 72 of the one can engage the sockets 78 of the other as shown more particularly in FIG. 12. It is to be noted that the two ribs 72a and 72f face in the opposite direction, and by displacing one strip half the width of the outer strip during the helical winding a doubled walled structure results, the rib 72a of one part of the strip engaging the rib 72e of the other part of the strip.

The wound strip as generally described in this specification can have a further strip wound over it, preferably in the opposite direction for further reinforcement, or it can be sprayed or can otherwise have applied to it when formed into a tubular object a bonding material to lock the sections of the strip firmly together.

Figure 13:
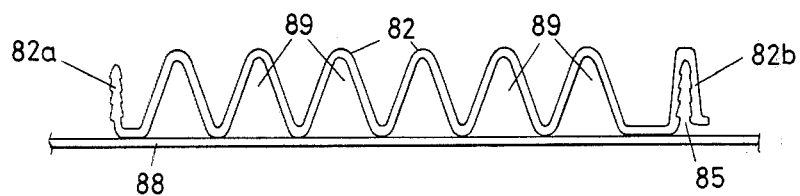
FIG. 13 shows the channels formed by a modified construction of the strip.

In FIG. 13 is shown diagrammatically how the ribs 82 are formed by shaping the strip into a corrugated form, the strip again having the barbed forming rib 82a and the complementary engaging rib 82b, the latter having the socket 85 formed in it. The strip is helically wound on to a pipe 88 to form a series of closed channels 89, the pipe wall being shown in section.

Figure 14:
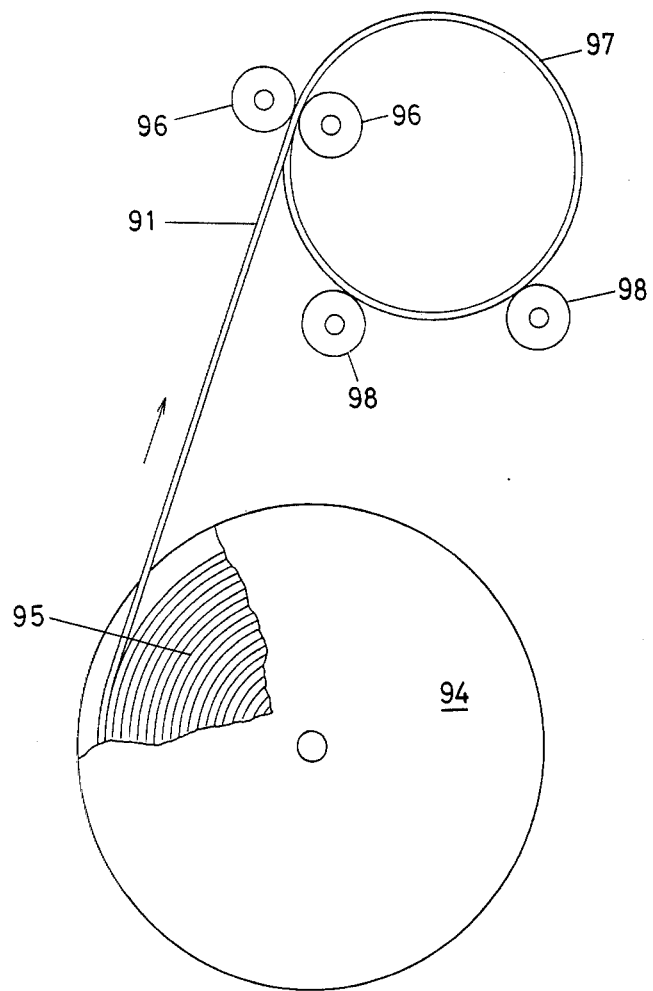
FIG. 14 shows very schematically how a strip of the invention may be drawn off from a supporting reel and formed into a tubular article.

FIG. 14 shows the strip 91 being fed from a reel 94, which contains a coil of strip 95, to between a pair of forming rollers 90 which force the joining rib into the socket of the engaging rib when the rollers 96 are driven to feed the strip 91 from the coil 95 on to itself at this point to form the tubular article 97, the article 97 resting on roller supports 98 which allow the article 97 to rotate as the further length of strip 91 from the coil 95 is joined on to it.

I claim:

1. A method of forming a tubular article comprising:

providing an elongated strip of plastic material having a joining rib, an engaging rib and a series of longitudinally extending ribs spaced apart across the width of the strip on at least one side thereof with each of said ribs terminating in a free end portion and with each of at least some of said ribs having a flange adjacent its free end portion;

helically winding said strip along a helical path without heating said strip to form the strip into a tubular configuration with the flanges forming reinforcements; and locking said joining rib to said engaging rib while helically winding the strip without heating and while the strip is in said tubular configuration to provide the tubular article.

2. A method as set forth in claim 1 wherein said step of providing said strip further includes providing said strip in a coil and said step of helically winding includes feeding said strip from the coil to said helical path.

3. A method as set forth in claim 2 further including the step of applying a bonding material to said strip to assist in holding the tubular article together.

4. A method as set forth in claim 2 wherein the engaging rib has a socket and said step of locking includes forcing the joining rib into the socket of the engaging rib with forming rollers during said step of helically winding.

5. A method as set forth in claim 1 wherein the engaging rib has a socket and said step of locking includes forcing the joining rib into the socket of the engaging rib with forming rollers during said step of helically winding.

6. A method of forming a tubular article comprising:

providing a coil of an elongated strip of plastic material having a joining rib, an engaging rib and a series of longitudinally extending ribs spaced apart across the width of the strip on at least one side thereof with each of said ribs terminating in a free end portion and with each of at least some of said ribs having a flange adjacent its free end portion;

feeding the strip from the coil;

helically winding the strip fed from the coil along a helical path to form the strip into a tubular configuration with the flanges forming reinforcements; and locking said joining rib to said engaging rib while helically winding the strip and while the strip is in said tubular configuration to provide the tubular article.

* * * * *